(12) United States Patent
Adamic et al.

(10) Patent No.: US 10,364,367 B2
(45) Date of Patent: Jul. 30, 2019

(54) NON-NEWTONIAN INKJET INKS

(71) Applicant: Hewlett-Packard Development Company, L.P., Houston, TX (US)

(72) Inventors: Raymond Adamic, Corvallis, OR (US); Brian Dooley, Albany, OR (US)

(73) Assignee: Hewett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/561,835

(22) PCT Filed: Jul. 24, 2015

(86) PCT No.: PCT/US2015/041967
§ 371 (c)(1),
(2) Date: Sep. 26, 2017

(87) PCT Pub. No.: WO2017/018987
PCT Pub. Date: Feb. 2, 2017

(65) Prior Publication Data
US 2018/0118964 A1 May 3, 2018

(51) Int. Cl.
| | |
|---|---|
| C09D 11/38 | (2014.01) |
| C09D 11/14 | (2006.01) |
| C09D 11/033 | (2014.01) |
| C09D 11/106 | (2014.01) |
| C09D 11/324 | (2014.01) |

(52) U.S. Cl.
CPC ............ C09D 11/38 (2013.01); C09D 11/033 (2013.01); C09D 11/106 (2013.01); C09D 11/14 (2013.01); C09D 11/324 (2013.01)

(58) Field of Classification Search
CPC .............................. C09D 11/30; C09D 11/50
See application file for complete search history.

(56) References Cited

U.S. PATENT DOCUMENTS

| | | | |
|---|---|---|---|
| 5,204,055 A | 4/1993 | Sachs et al. | |
| 5,660,621 A | 8/1997 | Bredt | |
| 6,537,358 B1* | 3/2003 | Horiuchi | C09B 67/0033 106/31.6 |
| 8,163,077 B2 | 4/2012 | Eron et al. | |
| 8,348,411 B2 | 1/2013 | Brust et al. | |
| 8,784,549 B2* | 7/2014 | Bermel | C09D 11/322 106/31.6 |
| 8,784,550 B2 | 7/2014 | Kasperchik | |
| 2005/0049739 A1 | 3/2005 | Kramer et al. | |
| 2007/0241482 A1 | 10/2007 | Giller et al. | |
| 2008/0257204 A1 | 10/2008 | Oriakhi et al. | |
| 2009/0004445 A1 | 1/2009 | Park et al. | |
| 2009/0163615 A1 | 6/2009 | Halahmi et al. | |
| 2013/0026683 A1 | 1/2013 | Ng et al. | |
| 2013/0160672 A1* | 6/2013 | Kasperchik | B82Y 30/00 106/31.65 |
| 2013/0284050 A1* | 10/2013 | Adamic | C09D 11/037 106/31.13 |
| 2015/0035209 A1 | 2/2015 | Shah et al. | |

FOREIGN PATENT DOCUMENTS

| | | |
|---|---|---|
| EP | 1498277 | 1/2005 |
| WO | WO-2009017648 | 2/2009 |
| WO | WO-2014068579 | 5/2014 |
| WO | WO-2015108543 | 7/2015 |

* cited by examiner

*Primary Examiner* — Veronica F Faison
(74) *Attorney, Agent, or Firm* — Dierker & Kavanaugh PC

(57) ABSTRACT

An example of a non-Newtonian inkjet ink includes first and second metal oxide nanoparticles, a colorant, an organic solvent, and a balance of water. The first metal oxide nanoparticle has a particle size of 10 nm or less, and is present in an amount ranging from about 5% to about 15% by weight based on a total weight of the ink. The second metal oxide nanoparticle has at least one dimension greater than 10 nm, and is present in an amount ranging from 0.25% to 10% by weight based on the total weight of the ink. The colorant is present in an amount ranging from about 0.5% to about 10% by weight based on the total weight of the ink. The organic solvent is present in an amount ranging from about 5% to about 50% by weight based on the total weight of the ink.

13 Claims, No Drawings

NON-NEWTONIAN INKJET INKS

BACKGROUND

The use of inkjet printing systems has grown dramatically in recent years. For example, in addition to home and office usage, inkjet technology has been expanded to high-speed, commercial and industrial printing. This growth may be attributed to substantial improvements in print resolution and overall print quality coupled with appreciable reduction in cost. Inkjet technology also offers low printer noise, the capability of high-speed recording, and the capability of multi-color recording.

Inkjet printing is a non-impact printing method that utilizes electronic signals to control and direct droplets or a stream of ink to be deposited on a printing medium. Some commercial and industrial inkjet printers utilize fixed printheads and a moving substrate web in order to achieve high speed printing. Current inkjet printing technology involves forcing the ink drops (in a precise pattern) through small nozzles by thermal ejection, piezoelectric pressure or oscillation onto the surface of the printing medium.

DETAILED DESCRIPTION

Inks used in inkjet recording are often composed of water-soluble organic solvents (humectants, etc.), surfactants, and colorants, typically in a predominantly aqueous fluid. When a recording is made on plain paper, the deposited colorants retain some mobility, which can be manifest in poor bleed, edge acuity, feathering, and inferior optical density/chroma (due to penetration on the paper). These features adversely impact text and image quality.

In some attempts to reduce the occurrence of these features, coated papers or coating the paper immediately before printing with the inkjet ink have been utilized with inkjet systems. These coatings contain various components, such as fixers that react with inkjet ink component(s) to reduce colorant mobility and improve colorant holdout. However, these systems can be costly (e.g., due, in part, to the additional coating materials), can lower print quality, and/or can be limiting as the media is typically matched to the inks.

When colorant holdout is improved, more colorant is present at the surface of the medium. While this may improve the optical density and/or chroma of the prints, this can also lead to less durable prints. In other words, these prints may be more susceptible to smearing, smudging, and/or scratching. Some attempts to improve print durability have included adding a polymeric binder to the inks. However, the addition of polymeric binder can introduce print reliability issues, in part because the ink viscosity increases and the printhead can clog more readily.

Non-Newtonian inkjet inks/fluids are disclosed herein that provide both colorant holdout and improved print durability on a wide variety of media types (e.g., plain paper, photopaper, brochure media, coated offset media, etc.). Each example of the non-Newtonian inks is prepared so that the viscosity of the inks can be manipulated by physical forces, allowing for printing of the inks via inkjet technologies while achieving improved viscosity upon printing. Examples of the non-Newtonian inks include small, charged metal oxide nanoparticles having a particle size of 10 nm or less, which are paired with either i) larger metal oxide nanoparticles (larger in diameter and/or length) or ii) polymers having hydrogen bonding capability and a particular weight average molecular weight. The small, charged metal oxide nanoparticles interact with other component(s) in the non-Newtonian ink, which may result in the formation of a structured network on the medium surface. Examples of the structured network disclosed herein have the propensity to flocculate on the surface of medium after printing, which improves colorant holdout and reduces colorant mobility (even on plain paper). The different structured networks that are formed in the various examples of the non-Newtonian ink will be described in more detail herein.

The use of the small, charged metal oxide nanoparticles increases the total number of particles present in the ink by orders of magnitude, e.g., when compared to inks that include larger colloidal particles (i.e., having an average diameter of 15 nm or more), when the same weight percentage of the respective particles is utilized in the respective inks. The small, charged metal oxide nanoparticles also have a higher surface area compared to the larger colloidal particles. On any media type (but in particular on plain paper), the combination of the high number of the small nanoparticles with the high surface area may increase the binding interaction of the small metal oxide nanoparticles with larger components (e.g., the larger nanoparticles, the polymers having hydrogen bonding capability, colorant particles, etc.) present in the ink when the ink is dried (e.g., when water and other co-solvent(s) are removed through absorption and evaporation). Improved binding interaction locks the colorant particles in place on the medium surface, thus improving print quality and durability. Additionally, on porous, coated media (e.g., photopaper, brochure media, coated offset media, etc.), the incorporation of the small nanoparticles may allow the ink to penetrate into the pores of the coating on the media, which also improves the durability.

Furthermore, some examples of the inks (which do not include salt(s)) disclosed herein surprisingly exhibit a relatively long shelf life because they exhibit lowered phase separation compared to other similarly formulated inks (which do include salt(s)). The improved shelf life versus phase separation may be due to balancing the charge density of the particles (i.e., removal of salt and inclusion of another metal oxide). For example, the inks disclosed herein that are formulated with silica may exhibit the highest stability because silica has a net surface charge that remains negative over the pH range. Essentially, the non-Newtonian nature of the inkjet inks of the present disclosure provide highly structured inks that can exhibit desirable optical density or color saturation, while the charge balance or difference/separation in charge density between various solids within the ink can facilitate enhanced storage stability over time, e.g., reduced phase separation.

Regarding the present description as it relates to "non-Newtonian," a non-Newtonian fluid is one which has viscosity dependent on an applied force such as shear or thermal forces (added thermal). For example, shear thinning fluids decrease in viscosity with increasing rate of shear. The inks of the present application can show these same shear thinning effects, under the fluid ejection conditions in which ink is moved between the fluid container and the printhead of an inkjet device. In another example, thermal thinning fluids decrease in viscosity with increasing rate of heat. The inks of the present application can likewise show these same thermal thinning effects, when the inks are heated during printing, e.g., at the fluid container or at the printhead of an inkjet device.

The various properties of the non-Newtonian inks disclosed herein can be quantified or characterized indirectly in various ways, including through dynamic viscosity at various shear rates (e.g., viscosity can be measured to indirectly show network formation or aggregation in the ink), through pH relative to the isoelectric point of one of the ink solids (e.g., pH at or above the isoelectric point of some examples of the larger metal oxide nanoparticles can provide a desirable balance of charge density), and/or through conductivity of the ink (e.g., conductivity from about 100 µS/cm to about 2000 µS/cm facilitates enhanced stability over inks with higher conductivity). The difference in the charge density of similarly charged small and large nanoparticles may also indirectly show network formation.

The non-Newtonian inkjet inks disclosed herein are useful in standard inkjet printing systems. The present non-Newtonian inkjet inks can be inkjet printed, as the viscosity of the non-Newtonian inkjet inks can be lowered using shear or thermal forces within an inkjet printhead. Once exiting the printhead, the viscosity of the present non-Newtonian inkjet inks rapidly increases (e.g. within 1 second to 30 seconds) via self-assembly of a structured network within the non-Newtonian inkjet inks. Generally, the structured network within the non-Newtonian inkjet inks can be assembled through interaction between the smaller metal oxide nanoparticles and the larger metal oxide nanoparticles, or between the smaller metal oxide nanoparticles and the polymers having hydrogen bonding capability.

The term "particle size" is used herein to describe at least the smaller metal oxide nanoparticles, the larger metal oxide nanoparticles, and the colorant. The particle size generally refers the diameter or average diameter, which may vary, depending upon the morphology of the particle. In an example, the respective particle may have a morphology that is substantially spherical. A substantially spherical particle (i.e., spherical or near-spherical) has a sphericity of >0.84. Thus, any individual particles having a sphericity of <0.84 are considered non-spherical (irregularly shaped). The particle size of the substantially spherical particle may be provided by its largest diameter, and the particle size of a non-spherical particle may be provided by its average diameter (i.e., the average of multiple dimensions across the particle) or by an effective diameter, which is the diameter of a sphere with the same mass and density as the non-spherical particle. In another example, the respective particle may have a morphology that is fibrous. A fibrous particle is like an elongated particle having a length that is greater than its diameter/particle size. In still another example, the respective particle may have a morphology that is a chain. The chain is made up of individual particles that are aggregated together. The length of the chain is greater than the diameter/particle size of any individual particle in the chain.

It is noted that when discussing the present non-Newtonian inkjet ink compositions, inkjet print cartridges, methods, etc., each of these discussions can be considered applicable to each of these examples, whether or not they are explicitly discussed in the context of that example. Thus, for example, in discussing a silica used in an example of the non-Newtonian inkjet ink, such a silica can also be used in a method of manufacturing the non-Newtonian inkjet ink, and vice versa.

Some examples of the non-Newtonian inkjet ink include the small, charged metal oxide nanoparticles (also referred to herein as first metal oxide nanoparticle(s) or small (metal oxide) nanoparticle(s)), the larger metal oxide nanoparticles (also referred to herein as second metal oxide nanoparticle(s) or large (metal oxide) nanoparticle(s)), a colorant, an organic solvent (also referred to herein as a co-solvent(s), and a balance of water. In some instances, the ink consists of these components. These examples will now be described.

As mentioned above, the small, charged metal oxide nanoparticles have a particle size of 10 nm or less (but greater than 0). As a specific example, the particle size of each small particle ranges from greater than 0 nm to about 2 nm. The small metal oxide nanoparticles may include a metal or semi-metal atom and at least one oxygen atom. Examples of suitable semi-metals include silicon, boron, germanium, arsenic, antimony, and tellurium. Examples of suitable metals include aluminum, zinc, iron, titanium, indium, zirconium, etc. Some specific examples of the small nanoparticles include substantially spherical or non-spherical silica particles, alumina particles, zinc oxide particles, iron oxide particles, titanium oxide particles (e.g., $TiO_2$), indium oxide particles, zirconium oxide particles, or combinations thereof. In some examples, the alumina particles that are present in the ink may have the formula AlO(OH), and may be diaspore (i.e., α-AlO(OH)) or boehmite (i.e., γ-AlO(OH)). In some other examples, the alumina particles that are present in the ink may have the formula $Al_2O_3$. In some examples of the ink, the small metal oxide nanoparticles include a combination of substantially spherical silica (particle size of about 2 nm to 5 nm) and substantially spherical alumina (particle size of about 3 nm to about 10 nm).

These examples of the non-Newtonian inkjet ink also include the large metal oxide nanoparticle. Any of the metal oxides listed for the small metal oxide nanoparticles may be used for the large metal oxide nanoparticles. Some specific examples include alumina (having the formula AlO(OH), e.g., α-AlO(OH) or γ-AlO(OH), or $Al_2O_3$), substantially spherical silica, anisotropic silica, and combinations thereof.

The large metal oxide nanoparticle has at least one dimension that is greater than 10 nm, and thus is larger than the small metal oxide nanoparticles. Any of the previous metal oxide materials may be used for the large metal oxide nanoparticles. As examples, the large metal oxide nanoparticles may be formed of silica, alumina, titanium oxide, and combinations thereof. As more specific examples, the large metal oxide nanoparticles may be substantially spherical silica particles having a diameter of about 50 nm, or substantially spherical alumina particles having a diameter ranging about 20 nm to about 30 nm. As another example, the large metal oxide nanoparticles may be anisotropic silica. One example of the anisotropic silica is fibrous silica having a diameter ranging from about 5 nm to about 50 nm and a length ranging from about 50 nm to about 250 nm, where the length is larger than the diameter. Another example of the anisotropic silica is chain silica formed of silica nanoparticles aggregated together similar to a string of pearls. The silica nanoparticles in chain silica each has a diameter ranging from about 5 nm to about 50 nm and the chain length ranges from about 50 nm to about 250 nm, where the length is larger than each of the diameters. In some of the examples disclosed herein, the ink includes a combination of large metal oxide nanoparticles, such as large, substantially spherical silica particles with large, substantially spherical alumina particles, or large anisotropic silica particles with large, substantially spherical alumina particles. The combinations of several types of large metal oxide nanoparticles with one type of small metal oxide nanoparticles show significantly improved durability (see the Examples section).

Any combination of the small nanoparticles and the large nanoparticles may be used in these examples of the non-Newtonian inkjet ink. As some suitable examples, the small nanoparticles and the large nanoparticles may both be formed of silica; the small nanoparticles may be formed of silica and the large nanoparticles may be formed of alumina; the small nanoparticles may be a combination of silica and alumina and the large nanoparticles may be silica; or the small nanoparticles may be formed of silica and the large nanoparticles may be a combination of silica and alumina. When different combinations of the small nanoparticles and the large nanoparticles are selected, the structured network that is formed after the ink is printed may vary. Several examples of the structured network will now be described.

With an arrangement of small and large nanoparticles that are formed of the same material, the nanoparticles are similarly charged within the ink. For example, small, substantially spherical silica particles have the same charge as large, anisotropic silica particles. However, the morphology or dimensions of the small and large silica nanoparticles affects the charge density of the respective nanoparticles. Additionally, the volume fraction of the particular particle affects the charge density, since charge density is a measure of the electric charge per unit of volume of space. Given a similar amount of charge on each particle, the small silica nanoparticles will have a larger charge density than the larger silica nanoparticles. The difference in charge density may be sufficient to enable the small and large silica particles to form the structured network. A desirable balance of charge density can be achieved by utilizing two different types (i.e., different morphology or dimensions) of silica (or other metal oxide) together in the non-Newtonian inkjet ink. This combination results in improved (lower) aqueous phase separation while maintaining good colorant holdout compared to non-Newtonian inks with significant differences in high charge density particles or salts. It is to be understood that the large silica nanoparticles are included in the inkjet ink at a concentration so that it is of a sufficient strength to affect a positive influence on the networking ability of these non-Newtonian inkjet inks.

In the example ink with small and large silica nanoparticles, the "structured network" refers to the three dimensional structure formed by the silica particles via loosely connected, physical interactions in the non-Newtonian inkjet ink, wherein the three dimensional structure is dependent upon mechanical and/or thermal forces. Such mechanical and/or thermal forces, such as shear energy or heat energy, weaken the structured network resulting in the viscosity changes based on the amount of force applied, as discussed herein.

The combination of large and small silica nanoparticles can be replaced in these example inks with other large and small metal oxide particles that are formed of the same material. These large and small metal oxide particles of the same material may exhibit a sufficient difference in charge density to form the structured network.

With any arrangement of silica nanoparticles and alumina nanoparticles, alumina has a charge density that is sensitive to the pH of the ink. When the pH of the ink is close to the isoelectric point or point of zero charge of the alumina, the amount of charge on the alumina particles is likewise at or near zero. As a result, a desirable balance of charge density and holding this zero charge effect to a minimum can be achieved by utilizing silica and the relatively low charge density alumina together in the non-Newtonian inkjet ink. This combination results in improved (lower) aqueous phase separation while maintaining good colorant holdout compared to non-Newtonian inks with high charge density particles or salts. However, the alumina also is included in the inkjet ink at a concentration so that it is of a sufficient strength to affect a positive influence on the networking ability of these non-Newtonian inkjet inks.

To illustrate by example, the pH of the non-Newtonian inkjet inks disclosed herein can be from 9 to 12. In one example, the pH can be from 9.5 to 11 or from 9.5 to 10.5, giving the alumina a negative charge that helps maintain a stable ink with other anionically charged metal or semi-metal species that may be present. Furthermore, the inkjet ink can be formulated so that the pH may in some cases drop at or below the isoelectric point of the alumina when printed on plain paper (or on a more neutral substrate), and thus, the negative charge becomes neutral or even positive. As a note, due to water evaporation, absorption, and/or concentration enrichment, the pH may actually not need to drop much to trigger a strong attraction interaction due to van der Waals interactions. Thus, in some cases, a drop in pH, even if not at or below the isoelectric point of the alumina can still have a positive effect.

In the example inks with small (or large) silica and large (or small) alumina particles, the "structured network" refers to the three dimensional structure formed by the silica particles in the presence of the alumina via electrostatic interactions and/or physical interactions in the non-Newtonian inkjet ink. The formation of this structured network involves attractive aggregation of the particles. More particularly, a strong attraction between the particles can occur and the van der Waals interactions increase, thereby forming a strong attractive potential that can result in the structured network by providing elastic content to a predominantly fluidic system. When alumina is utilized, the structured network may form before the ink is printed onto a medium. However, the three dimensional structure is dependent upon mechanical and/or thermal forces. Such mechanical and/or thermal forces, such as shear energy or heat energy, weaken the structured network resulting in the viscosity changes based on the amount of force applied, as discussed herein.

The combination small (or large) silica and large (or small) alumina particles may be replaced in these example inks with other large and small metal oxide particles that behave similarly to silica and alumina.

The structured networks disclosed herein may trap and/or bond with the colorant(s) present in the inks.

Additionally, each of the structured networks in these examples of the non-Newtonian ink can be free of polymers, in that the three dimensional structure does not include polymers. However, such an example does not preclude polymers from being present within the non-Newtonian inkjet ink, or even trapped or contained within the structured network. For example, the present non-Newtonian inkjet inks can further include a polymeric surfactant that does not self-assemble as part of the three dimensional structure, but can be present within such a structure. As examples, the non-Newtonian inkjet inks may include non-ionic, cationic, and/or anionic polymeric surfactants, ranging from 0.01% by weight to 10% by weight. An example of a suitable non-ionic surfactant is commercially available under the tradename PLURONIC® P123 (a difunctional block copolymer surfactant terminating in primary hydroxyl groups).

The small metal oxide nanoparticles and/or the larger metal oxide nanoparticles may be incorporated into examples of the non-Newtonian inkjet ink as part of respective aqueous nanoparticle dispersion. As examples, a first aqueous nanoparticle dispersion may include water, the small metal oxide nanoparticles, and a dispersant, and a second aqueous nanoparticle dispersion may include water, the larger metal oxide nanoparticles, and a dispersant.

Examples of suitable dispersants include water-soluble anionic species of low and high molecular weight such as phosphates and polyphosphates, phosphonates and poly-phosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse silica and/or alumina particles can be a polyether alkoxysilane or polyether phosphate dispersant.

Examples of polyether alkoxysilane dispersants used to disperse the small and/or large metal oxide nanoparticles can be represented by the following general Formula (I):

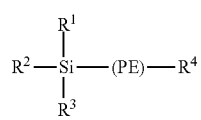
(I)

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)O$—), or a mixture of both types. In some examples, the polyether chain segment (PE) contains PEG units (—$CH_2CH_2$—O—).

c) $R^4$ is hydrogen, or a linear or a branched alkyl group. In some examples, $R^4$ is an alkyl group having from 1 to 5 carbon atoms.

Other examples of dispersants used to disperse the small and/or large metal oxide nanoparticles can include polyether alkoxysilane dispersants having the following general Formula (II):

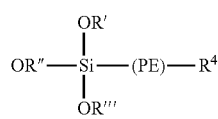
(II)

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the small and/or large metal oxide particles present in examples of the ink composition are dispersed with polyether alkoxysilanes. Examples of suitable polyether alkoxysilanes include $(CH_3O)_3Si—(CH_2CH_2O)_n'H$; $(CH_3CH_2O)_3Si—(CH_2CH_2O)_n'H$; $(CH_3O)_3Si—(CH_2CH_2O)_n'CH_3$; $(CH_3CH_2O)_3Si—(CH_2CH_2O)_n'CH_3$; $(CH_3O)_3Si—(CH_2CH_2O)_n'CH_2CH_3$; $(CH_3CH_2O)_3Si—(CH_2CH_2O)_n'CH_2CH_3$; $(CH_3O)_3Si—(CH_2CH(CH_3)O)_n'H$; $(CH_3CH_2O)_3Si—(CH_2CH(CH_3)O)_n'H$; $(CH_3O)_3Si—(CH_2CH(CH_3)O)_n'CH_3$; and $(CH_3CH_2O)_3Si—(CH_2CH(CH_3)O)_n'CH_3$; wherein n' is an integer equal to 2 or greater. In some examples, n' is an integer ranging from 2 to 30 and, in some other examples, n' is an integer ranging from 5 to 15.

Commercially available examples of the polyether alkoxysilane dispersants include SILQUEST®A-1230 manufactured by Momentive Performance Materials and DYNASYLAN® 4144 manufactured by Evonik/Degussa.

The amount of dispersant used in the smaller or large metal oxide nanoparticle dispersion may vary from about 1% by weight to about 300% by weight of the small or large particles content, respectively. In some examples, the dispersant content range is between about 2% to about 150% by weight of the small or large particles content. In some other examples, the dispersant content range is between about 5% to about 100% by weight of the small or large particles content. The dispersion of small or large particles can be prepared via milling or dispersing the selected small or large particle powder in water in the presence of suitable dispersant(s).

In an example, the small or large dispersion may be prepared by milling commercially available inorganic oxide pigment having a large particle size (in the micron range) in the presence of the dispersants described above until the desired particle size is achieved. The starting dispersion to be milled can be an aqueous dispersion with solid content up to 40% by weight of the small or large particles. The milling equipment that can be used is a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired.

In some examples of the non-Newtonian inkjet ink, the small nanoparticles are present in an amount ranging from about 5% to about 15% by weight based on a total weight of the non-Newtonian inkjet ink, and the large nanoparticles are present in an amount ranging from about 0.25% to about 10% by weight based on the total weight of the non-Newtonian inkjet ink. When either of the nanoparticles are incorporated into the ink in the form of the aqueous metal oxide nanoparticle dispersion, it is to be understood that the weight percent given represents the percent solids that are added, not the total weight percent (which also includes any liquid) of the respective aqueous nanoparticle dispersion that is added.

Some examples of commercially available dispersions or powders suitable for use as the small nanoparticles include SNOWTEX® ST-S (2 nm colloidal silica dispersion, Nissan Chemical) or DISPERAL® P2 (3 nm to 10 nm boehmite powder, Sasol North America). The alumina powder is dispersible in water, and shearing may be used to suitably disperse the powder in water. Some examples of commercially available dispersions suitable for use as the large nanoparticle dispersion include ST-30-LH (50 nm colloidal silica dispersion, Nissan Chemical) or SNOWTEX® ST-UP (anisotropic, fiber-like silica dispersion with dimensions of 10 nm to 15 nm by 100 nm to 140 nm, Nissan Chemical) or gamma $Al_2O_3$ (20 nm to 30 nm alumina dispersion, US Research Nanomaterials, Inc.). It is to be understood that the particle size may vary depending upon the equipment and technique used to make the dispersion. In an example, the particle size is measured with a dynamic light scattering (DLS) tool from Nanotrac Co.

As mentioned above, these examples of the non-Newtonian fluids also include a colorant. The colorant may be a part of the previously described structured networks, such that the colorant is caused to stay on the surface of the medium after printing. The colorant may be present in the non-Newtonian inks/fluids in an amount ranging from about 0.5% to about 10% by weight based on the total weight of the non-Newtonian inkjet ink. As another example, the amount of colorant may range from about 1% to about 7% by weight.

The colorant may be colored pigments and/or dyes. In one example, the colorant is a pigment, and in one aspect, a dispersed pigment. Pigments can be any dispersed colorant generally used in the inkjet arts, including, for example, self-dispersed pigments that are dispersed by small molecules or polymers, etc., or dispersing agent dispersed pigments that are dispersed by the addition of a separate dispersing agent, e.g., a polymeric dispersing agent. Some example pigments include charged pigments, such as carbon black or another black pigment or a charged colored pigment. In other examples, the colorant can be a dye, including one or more of the many water soluble dyes that are typically used in the inkjet arts. Examples include direct dyes, vat dyes, sulfur dyes, organic dyes, reactive dyes, disperse dyes, acid dyes, azo dyes, or basic dyes. In yet another example, the colorant can be a mixture of a pigment and a dye.

Even though the colorant may be large and dense pigments (e.g., having a particle size of about 100 nm), the colorant in the non-Newtonian inkjet inks shows little or no settling in the fluid container or printhead during the times when the ink is not moving through the system or when the ink is not heated. When little or no dynamic pressure is being applied to the ink to move it through the system or when no heat is being applied to the ink, the ink has a viscous consistency. However, when the normal amount of dynamic pressure (at least ~10,000 Pascals) is applied to the ink to move it through the inkjet system or when the ink is heated to 50° C. or more, the ink viscosity can change significantly, e.g., going from 25 cps to 2 cps. Thus, when such inks are ejected at a high frequency from inkjet dispensing devices, the dynamic viscosities of the inks measured inside of the printhead do not interfere with the ejection process of the inkjet system. Generally, during the time when the ink is not moving or being heated, pigment or other particulate settling is either completely prevented or slowed down by several orders of magnitude.

The non-Newtonian inkjet inks have a liquid phase (in which the structured networks form) that contains the previously mentioned organic solvent. The organic solvent may be any single organic solvent or organic solvent mixture. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, $C_{4-8}$ alcohols, 1-methoxy-2-propanol, 2-methoxy ethanol, 2-ethoxy ethanol, 1-methoxy-2-acetoxy propane, ethyl lactate, a glycol ether (in some instances having at least about 10 carbon atoms), a dihydric alcohol (in some instances having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-bis(2-hydroxyethyl)-5,5-dimethylhydantoin (DANTOCOL® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, measured at any functional shear rate. Also as used herein, "network non-participating solvent" refers to organic solvents that decrease the viscosity of the non-Newtonian inkjet ink, measured at any functional shear rate. As such, the present non-Newtonian inkjet inks can be altered based on the types of organic solvents used. For example, when the non-Newtonian inkjet ink includes a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxy-propanediol (EHPD), glycerol, 1,5-pentanediol, ethylene glycol, triethylene glycol, and mixtures thereof. In another example, network non-participating solvents can include 2-pyrrolidinone, 1,2-pentanediol, MPdiol, 1,2-hexanediol, sorbitol, 1-(2-hydroxyethyl)-2-pyrrolidinone, sulfolane, and mixtures thereof.

As such, the structured network properties and resultant non-Newtonian inkjet ink properties can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from about 5% to about 50% by weight based on the total weight of the non-Newtonian inkjet ink. In another aspect, the organic solvent can be present in an amount ranging from about 20% to about 40% by weight.

In addition to the small and large nanoparticles, the colorant, and the organic solvent, these examples of the non-Newtonian inkjet inks may also include a sugar or a sugar alcohol in an amount ranging from about 2% to about 20% by weight based on the total weight of the non-Newtonian inkjet ink. Sugar or sugar alcohols may improve curl in the non-Newtonian inks. Some sugars also include a chemically reactive component, such as an aldehyde, that can further associate with the metal oxide particles (large or small) to improve durability. Sugar alcohols do not chemically react, but can physically associate with the metal oxide particles (large or small) to improve durability. Examples of suitable sugars include glucose, sucrose, etc., and examples of suitable sugar alcohols include sorbitol, mannitol, etc. Any combinations of the sugars or sugar alcohols may also be included.

The balance of the non-Newtonian ink is water (e.g., deionized water). In one specific example, the inkjet ink can be an aqueous inkjet ink, including a water content from 30% to 95% by weight. It is to be understood that some examples of the inks may further include other components, such as biocides, viscosity modifiers, materials for pH adjustment, sequestering agents, preservatives, and the like.

Unlike the previously described example inks which include a combination of the large nanoparticles and the small nanoparticles, other examples of the non-Newtonian inkjet ink disclosed herein include the small, charged metal oxide nanoparticles, a polymer having hydrogen bonding capability, the sugar alcohol, the colorant, and a balance of water. In some instances, the ink consists of these components. These examples will now be described.

In these example non-Newtonian inkjet inks, any of the previously described small metal oxide nanoparticles, sugar alcohols, and colorants may be used in the same previously described amounts. The water content may vary depending upon the other components used, but in an example the water content ranges from 30% to 95% by weight.

These examples of the non-Newtonian inkjet inks do not include the large metal oxide nanoparticles, but rather include the polymer having hydrogen bonding capability. The polymer having hydrogen bonding capability is capable of hydrogen bonding with the small metal oxide nanoparticle to form yet another example of the structured network. In this example, the "structured network" refers to the three dimensional structure formed by the small particles in the presence of the polymer via hydrogen bonding in the non-Newtonian inkjet ink. The formation of this structured network may involve attractive aggregation of the particles and the polymer. The three dimensional structure is dependent upon mechanical and/or thermal forces. Such mechanical and/or thermal forces, such as shear energy or heat energy, weaken the structured network resulting in the viscosity changes based on the amount of force applied, as discussed herein.

Examples of the polymer having hydrogen bonding capability have a weight average molecular weight ranging from about 6,000 to about 25,000. In an example, the weight average molecular weight of the polymer is about 15,000. One specific example of the polymer having hydrogen bonding capability is poly(vinyl alcohol) having a weight average molecular weight of about 15,000.

The polymer having hydrogen bonding capability may be present in these examples of the non-Newtonian inkjet ink in an amount ranging from about 0.1% to less than 5% by weight based on the total weight of the non-Newtonian inkjet ink. It is to be understood that a lower amount may be included when the molecular weight is higher, and a higher amount may be included when the molecular weight is lower.

The properties of the non-Newtonian inkjet inks, e.g., viscosity, optical density, ink efficiency, etc., can be affected by a number of variables including the type of the specific small nanoparticles used, and in different examples, the type of large nanoparticles and/or the type of solvents used, or the type of polymer having hydrogen bonding capability used, the amounts of these components, pH, ionic strength, etc. Regarding viscosity, as discussed herein, the viscosity for non-Newtonian fluids are not discrete but change based on the physical energy applied to the fluid. As used herein, "viscosity" refers to dynamic viscosity unless otherwise stated. For the present inks, the viscosity can generally be measured at two states: proximate in time to an at rest state; i.e., with a minimum shear applied to the ink (shear rate as low as 5 s$^{-1}$), and proximate in time to a processing state; i.e., with a significant shear applied to the ink (shear rate of at least 10,000 s$^{-1}$ before the firing chamber of the printhead, and 500,000 s$^{-1}$ or higher in the firing chamber of the printhead). Any of the examples of the non-Newtonian inkjet ink disclosed herein can have a dynamic viscosity ranging from 5 cps to 10,000 cps at shear rate of 5 s$^{-1}$ and a dynamic viscosity ranging from 10 cps to 100 cps at a shear rate of 10,000 s$^{-1}$, measured at 25° C. At an even higher shear rate range (>50,000-500,000 s$^{-1}$ or more) dynamic viscosity of the inks can drop further, e.g., from 2 cps to 10 cps. As such, high shear rates or other mechanical or thermal forces can enable reliable jetting from inkjet printheads. Such viscosities can be measured using an Anton Paar Rheometer or a CAP2000 Rheometer from Brookfield Instruments, or an m-VROC™ Viscometer from RheoSense, and can be measured by shearing at room temperature (25° C.). Notably, the addition of heat with shear can alter, e.g. lower, the viscosity profiles of the present inks.

The non-Newtonian inkjet inks of the present disclosure can be very stable over time, and this stability can be attributed in part to their relatively low conductivity levels. Any of the example inks disclosed herein can have a conductivity ranging from about 100 micro Siemens per centimeter (μS/cm) to about 2,000 μS/cm. Lower conductivities within this range can improve stability on the one hand, but, in some examples, higher concentrations of alumina may improve the charge balance on the other hand (though higher concentrations may also raise the conductivity level within the ink). Thus, other more specific ranges of conductivity that can be selected for formulating the inks of the present disclosure can range from about 100 µS/cm to about 1,000 µS/cm or from about 500 µS/cm to about 1,000 µS/cm, for example.

Still further, any examples of the non-Newtonian inks disclosed herein may be used in conjunction with multiple imaging systems, examples of which include thermal or piezo inkjet, electrostatic, liquid electrophotographic printing (LEP), etc.

In addition to the non-Newtonian inkjet inks described herein, the present disclosure provides for inkjet print cartridges loaded with the inks described herein, as well as to a method of preparing the inkjet inks. For example, an inkjet print cartridge can be loaded with the non-Newtonian inkjet ink of the present disclosure. The inkjet print cartridge can be adapted for shearing the non-Newtonian inkjet ink within the printhead at a shear rate of 10,000 s$^{-1}$ or more (e.g., 500,000 s$^{-1}$ or more in the firing chamber) to provide a dynamic viscosity ranging from 2 cps to 100 cps.

In an example, a method of manufacturing a non-Newtonian inkjet ink can include adding, to a liquid vehicle water and the organic solvent, suitable amounts of a small nanoparticle dispersion, a large nanoparticle dispersion, and a colorant dispersion. In another example, a method of manufacturing a non-Newtonian inkjet ink can include adding, to water, suitable amounts of a small nanoparticle dispersion, the polymer having hydrogen bonding capability, the sugar alcohol, and a colorant dispersion. Examples of the non-Newtonian inkjet ink can be formed having a pH from 9 to 12 and a conductivity from 100 to 2000 µS/cm.

Regarding the methods generally, the various steps can be performed in a number of sequences and are not intended to be limited to require any particular sequence. For example, the adding of the small nanoparticle dispersion can be before adding the large nanoparticle dispersion, and vice versa.

To further illustrate the present disclosure, an example is given herein. It is to be understood that this example is provided for illustrative purposes and is not to be construed as limiting the scope of the present disclosure.

EXAMPLE

One example ink (A) was prepared according to the example non-Newtonian inks disclosed herein which include the polymer capable of hydrogen bonding. The formulation of this ink is shown in Table 1.

TABLE 1

Example Ink A

| Ink Component | Wt % |
| --- | --- |
| Carbon Black Ink Dispersion | 3.5 |
| Sorbitol (sugar alcohol) | 10 |
| SNOWTEX ® ST-S | 10 |
| (2 nm colloidal silica dispersion) | |
| Poly(vinyl alcohol), 15,000 MW | 2 |
| Water | balance |
| pH | 9-10 |

Seven example inks (B-H) were prepared according to the example non-Newtonian inks disclosed herein which include the combination of small and large metal oxide nanoparticles. The formulations of these inks are shown in Table 2.

TABLE 2

Example Inks B-H

| Ink Component | Wt % |
| --- | --- |
| Example Ink B | |
| CAB-O-JET ® 300 Carbon Black Ink Dispersion | 3.5 |
| Sorbitol (sugar alcohol) | 5 |
| Mannitol (sugar alcohol) | 5 |
| 2-pyrrolidinone (organic solvent) | 5 |
| SNOWTEX ® ST-S | 7 |
| (2 nm colloidal silica dispersion) | |
| SNOWTEX ® ST-30-LH | 3 |
| (50 nm colloidal silica dispersion) | |
| Gamma $Al_2O_3$ (20 nm to 30 nm alumina dispersion) | 1 |
| Water | balance |
| pH | 9-10 |
| Example Ink C | |
| CAB-O-JET ® 300 Carbon Black Ink Dispersion | 2.75 |
| Sorbitol (sugar alcohol) | 5 |
| 2-pyrrolidinone (organic solvent) | 12.5 |
| SNOWTEX ® ST-S | 10 |
| (2 nm colloidal silica dispersion) | |
| SNOWTEX ® ST-UP | 3 |
| (anisotropic, fiber-like silica dispersion with dimensions of 10 nm to 15 nm by 100 nm to 140 nm) | |
| Gamma $Al_2O_3$ (20 nm to 30 nm alumina dispersion) | 1 |
| Water | balance |
| pH | 10 |
| Example Ink D | |
| CAB-O-JET ® 300 Carbon Black Ink Dispersion | 2.75 |
| Sorbitol (sugar alcohol) | 5 |
| 2-pyrrolidinone (organic solvent) | 12.5 |
| SNOWTEX ® ST-S | 10 |
| (2 nm colloidal silica dispersion) | |
| SNOWTEX ® ST-UP | 3 |
| (anisotropic, fiber-like silica dispersion with dimensions of 10 nm to 15 nm by 100 nm to 140 nm) | |
| Gamma $Al_2O_3$ (20 nm to 30 nm alumina dispersion) | 1 |
| Water | balance |
| pH | 10 |
| Example Ink E | |
| CAB-O-JET ® 300 Carbon Black Ink Dispersion | 3.0 |
| Sorbitol (sugar alcohol) | 5 |
| 2-pyrrolidinone (organic solvent) | 12.5 |
| SNOWTEX ® ST-S | 10 |
| (2 nm colloidal silica dispersion) | |
| SNOWTEX ® ST-UP | 3 |
| (anisotropic, fiber-like silica dispersion with dimensions of 10 nm to 15 nm by 100 nm to 140 nm) | |
| Gamma $Al_2O_3$ (20 nm to 30 nm alumina dispersion) | 1.25 |
| Water | balance |
| pH | 10 |
| Example Ink F | |
| CAB-O-JET ® 300 Carbon Black Ink Dispersion | 3.0 |
| Sorbitol (sugar alcohol) | 5 |
| 2-pyrrolidinone (organic solvent) | 12.5 |
| SNOWTEX ® ST-S | 10 |
| (2 nm colloidal silica dispersion) | |
| SNOWTEX ® ST-UP | 3 |
| (anisotropic, fiber-like silica dispersion with dimensions of 10 nm to 15 nm by 100 nm to 140 nm) | |
| Gamma $Al_2O_3$ (20 nm to 30 nm alumina dispersion) | 1.25 |
| PLURONIC ® P123 | 0.2 |
| (a difunctional block copolymer surfactant terminating in primary hydroxyl groups) | |
| Water | balance |
| pH | 10 |
| Example Ink G | |
| CAB-O-JET ® 300 Carbon Black Ink Dispersion | 3.0 |
| Glucose (sugar) | 5 |
| 2-pyrrolidinone (organic solvent) | 15 |
| SNOWTEX ® ST-S | 12 |
| (2 nm colloidal silica dispersion) | |

TABLE 2-continued

Example Inks B-H

| Ink Component | Wt % |
|---|---|
| Gamma Al$_2$O$_3$ (20 nm to 30 nm alumina dispersion) | 1 |
| Water | balance |
| pH | 10 |

Example Ink H

| Ink Component | Wt % |
|---|---|
| CAB-O-JET ® 300 Carbon Black Ink Dispersion | 3.0 |
| Sorbitol (sugar alcohol) | 5 |
| 2-pyrrolidinone (organic solvent) | 12.55 |
| SNOWTEX ® ST-S | 10 |
| (2 nm colloidal silica dispersion) | |
| DISPERAL ® P2 (3 nm to 10 nm boehmite powder dispersed in water) | 0.5 |
| SNOWTEX ® ST-30-LH | 3 |
| (50 nm colloidal silica dispersion) | |
| Water | balance |
| pH | 10 |

One control ink was also utilized, namely OFFICEJET® Pro X (black ink available from Hewlett Packard) (referred to herein as Comparative Example).

The example and control inks were printed or applied on several different types of media, including plain paper (HP recycled office paper), HP photopaper, HP brochure media, coated offset media (Sterling Ultra Gloss), and laser bond paper from Hammermill. A prototype printer similar to the HP OFFICEJET® Pro 8000 was used to apply inks A through F and Ink H. Ink G was applied using a drawn down test.

Black bars were printed on the medium with white spaces of the medium (i.e., no ink printed thereon) between the bars. The optical density (in milli optical density units, milliOD) of the black bars was measured. At varying times after printing (i.e., after the ink was allowed to dry), a highlighter was uni-directionally passed across the bars (from bar 1 to bar X across the media) and onto the white spaces of the medium adjacent to the bars. The number of passes varied. The optical density of the highlighter smear on the non-printed white spaces was measured. This measurement was indicative of the amount of ink transferred from the printed bar to the adjacent white space, and demonstrates the durability of the print. The various conditions are described below for the different inks.

It is to be understood that the background optical density from the highlighter itself ranges from about 0.03 milliOD to about 0.04 milliOD. This background optical density was not subtracted from the values listed in the following tables. As such, durability results of <0.05 milliOD may be indicative of some minute amount of ink transfer, or may be indicative of the background of the highlighter itself (i.e., no ink transfer). The reported optical density values are even lower when the background optical density is accounted for.

For example Ink A, there were a total of 4 bars printed and 4 adjacent white spaces for each medium used. The ink was allowed to dry for 10 minutes, and then 5 passes of the highlighter were performed. The durability results for Ink A are shown in Table 3.

TABLE 3

Example Ink A-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 |
|---|---|---|---|---|---|---|---|---|
| HP photopaper | 2.01 | 0.07 | 2.12 | 0.05 | 2.15 | 0.05 | 2.18 | 0.05 |
| HP brochure media | 2.01 | 0.03 | 2 | 0.3 | 2.03 | 0.03 | 2.09 | 0.03 |

Ink A exhibited almost no highlighter smear after minimal ink dry time on both types of coated media that were used.

For example Ink B, there were a total of 5 bars printed and 5 adjacent white spaces. Two examples (1 and 2) were printed on plain paper. Ink B for the first example was allowed to dry for 3 hours, and then 2 passes of the highlighter were performed. Ink B for the second example was allowed to dry for 24 hours, and then 2 passes of the highlighter were performed. The durability results for Ink B are shown in Table 4.

TABLE 4

Example Ink B-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 | OD of Bar 5 | Ink Trans. from Bar 5 |
|---|---|---|---|---|---|---|---|---|---|---|
| Plain Paper 1 | 1.39 | 0.11 | 1.46 | 0.15 | 1.48 | 0.19 | 1.51 | 0.2 | 1.53 | 0.27 |
| Plain Paper 2 | 1.39 | 0.12 | 1.46 | 0.15 | 1.48 | 0.15 | 1.51 | 0.2 | 1.53 | 0.21 |

Example Ink B exhibited little highlighter smear on plain paper. It was noted that the dry time did not seem to have an effect on the amount of Ink B that was transferred.

For example Ink C, there were a total of 5 bars printed and 5 adjacent white spaces. Four examples (1-4) were printed on plain paper. Ink C for the first example was allowed to dry for 15 minutes, and then 2 passes of the highlighter were performed. Ink C for the second example was allowed to dry for 60 minutes, and then 2 passes of the highlighter were performed. Ink C for the third example was allowed to dry for 4 hours, and then 2 passes of the highlighter were performed. Ink C for the fourth example was allowed to dry for 16 hours, and then 2 passes of the highlighter were performed. Three examples (5-7) were printed on Hammermill laser bond paper. Ink C for the fifth example was allowed to dry for 30 minutes, and then 2 passes of the highlighter were performed. Ink C for the sixth example was allowed to dry for 60 minutes, and then 2 passes of the highlighter were performed. Ink C for the seventh example was allowed to dry for 2 hours, and then 2 passes of the highlighter were performed. One example (8) was printed on HP brochure media. Ink C for the eighth example was allowed to dry for 30 minutes, and then 5 passes of the highlighter were performed. The durability results for Ink C are shown in Table 5.

TABLE 5

Example Ink C-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 | OD of Bar 5 | Ink Trans. from Bar 5 |
|---|---|---|---|---|---|---|---|---|---|---|
| Plain Paper 1 | 1.09 | 0.14 | 1.3 | 0.16 | 1.46 | 0.15 | 1.55 | 0.15 | 1.57 | 0.13 |
| Plain Paper 2 | 1.09 | 0.12 | 1.3 | 0.15 | 1.46 | 0.17 | 1.55 | 0.22 | 1.57 | 0.22 |
| Plain Paper 3 | 1.09 | 0.1 | 1.3 | 0.11 | 1.46 | 0.11 | 1.55 | 0.14 | 1.57 | 0.12 |
| Plain Paper 4 | 1.09 | 0.09 | 1.3 | 0.08 | 1.46 | 0.09 | 1.55 | 0.12 | 1.57 | 0.15 |
| Laser Bond 5 | 1.12 | 0.3 | 1.12 | 0.3 | 1.12 | 0.24 | 1.12 | 0.27 | 1.12 | 0.29 |
| Laser Bond 6 | 1.12 | 0.08 | 1.12 | 0.06 | 1.12 | 0.07 | 1.12 | 0.06 | 1.12 | 0.07 |
| Laser Bond 7 | 1.12 | 0.05 | 1.12 | 0.05 | 1.12 | 0.06 | 1.12 | 0.05 | 1.12 | 0.05 |
| HP Brochure Media | 1.75 | 0.19 | 1.75 | 0.21 | 1.75 | 0.2 | 1.75 | 0.2 | 1.75 | 0.19 |

Example Ink C on plain paper exhibited little highlighter smear. Additionally, it was noted that on the plain paper, the amount of Ink C transferred from bars 1 through 4 generally decreased as the dry time increased. On the Hammermill laser bond paper, the amount of Ink C transferred from bars 1 through 5 significantly improved as the dry time increased. After 2 hours of drying, there was little to no transfer of Ink C from the bars printed on the laser bond paper. Example Ink C on HP brochure media exhibited little highlighter smear.

For example Ink D, there were a total of 4 bars printed and 4 adjacent white spaces on HP brochure media. The ink was allowed to dry for 10 minutes, and then 2 passes of the highlighter were performed. The durability results for Ink D are shown in Table 6.

TABLE 6

Example Ink D-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 |
|---|---|---|---|---|---|---|---|---|
| HP brochure media | 1.44 | 0.11 | 1.73 | 0.15 | 1.95 | 0.16 | 2.01 | 0.18 |

Example Ink D on HP brochure media exhibited very little highlighter smear. The average ink transfer in this example was small (about 0.12 milliOD) when taking into account the background optical density from the highlighter.

For example Ink E, there were a total of 5 bars printed and 5 adjacent white spaces for each media used. Two examples (1-2) were printed on HP brochure media. Ink E for the first example was allowed to dry for 15 minutes, and then 2 passes of the highlighter were performed. Ink E for the second example was allowed to dry for 30 minutes, and then 5 passes of the highlighter were performed. Four examples (3-6) were printed on plain paper. Ink E for the third example was allowed to dry for 30 minutes, and then 2 passes of the highlighter were performed. Ink E for the fourth example was allowed to dry for 90 minutes, and then 2 passes of the highlighter were performed. Ink E for the fifth example was allowed to dry for 6 hours, and then 2 passes of the highlighter were performed. Ink E for the sixth example was allowed to dry for 20 hours, and then 2 passes of the highlighter were performed. The durability results for Ink E are shown in Table 7.

TABLE 7

Example Ink E-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 | OD of Bar 5 | Ink Trans. from Bar 5 |
|---|---|---|---|---|---|---|---|---|---|---|
| HP Brochure Media 1 | 0.61 | No smear | 1.08 | No smear | 1.5 | No smear | 1.68 | No smear | 1.77 | No smear |
| HP Brochure Media 2 | 0.61 | No smear | 1.08 | No smear | 1.5 | No smear | 1.68 | No smear | 1.77 | No smear |
| Plain Paper 3 | 1.15 | 0.2 | 1.3 | 0.28 | 1.4 | 0.28 | 1.4 | 0.27 | 1.5 | 0.3 |
| Plain Paper 4 | 1.15 | 0.17 | 1.3 | 0.21 | 1.4 | 0.19 | 1.4 | 0.27 | 1.5 | 0.24 |

TABLE 7-continued

Example Ink E-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 | OD of Bar 5 | Ink Trans. from Bar 5 |
|---|---|---|---|---|---|---|---|---|---|---|
| Plain Paper 5 | 1.15 | 0.15 | 1.3 | 0.15 | 1.4 | 0.18 | 1.4 | 0.22 | 1.5 | 0.25 |
| Plain Paper 6 | 1.15 | 0.08 | 1.3 | 0.07 | 1.4 | 0.08 | 1.4 | 0.09 | 1.5 | 0.11 |

For example Ink E on the HP brochure media, there was no highlighter smear, regardless of the dry time. Example Ink E on plain paper exhibited improved durability (i.e., less ink transferred) as the dry time increased. After 20 hours of drying, there was almost no transfer of Ink E from any of the bars.

For example Ink F, there were a total of 4 bars printed and 4 adjacent white spaces for each media used. Five examples (1-5) were printed on coated offset media. Ink F for the first example was allowed to dry for 10 minutes, and then 2 passes of the highlighter were performed. Ink F for the second example was allowed to dry for 30 minutes, and then 2 passes of the highlighter were performed. Ink F for the third example was allowed to dry for 60 minutes, and then 2 passes of the highlighter were performed. Ink F for the fourth example was allowed to dry for 2 hours, and then 2 passes of the highlighter were performed. Ink F for the fifth example was allowed to dry for 6 hours, and then 2 passes of the highlighter were performed. Six examples (6-11) were printed on Hammermill laser bond paper. Ink F for the sixth example was allowed to dry for 10 minutes, and then 2 passes of the highlighter were performed. Ink F for the seventh example was allowed to dry for 30 minutes, and then 2 passes of the highlighter were performed. Ink F for the eighth example was allowed to dry for 60 minutes, and then 2 passes of the highlighter were performed. Ink F for the ninth example was allowed to dry for 2 hours, and then 2 passes of the highlighter were performed. Ink F for the tenth example was allowed to dry for 6 hours, and then 2 passes of the highlighter were performed. Ink F for the eleventh example was allowed to dry for 24 hours, and then 2 passes of the highlighter were performed. The durability results for Ink F are shown in Table 8.

TABLE 8

Example Ink F-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 |
|---|---|---|---|---|---|---|---|---|
| Coated offset Media 1 | 1.07 | 0.38 | 1.55 | 0.43 | 1.7 | 0.55 | 1.85 | 0.42 |
| Coated offset Media 2 | 1.07 | 0.12 | 1.55 | 0.19 | 1.7 | 0.2 | 1.85 | 0.2 |
| Coated offset Media 3 | 1.07 | 0.12 | 1.55 | 0.11 | 1.7 | 0.11 | 1.85 | 0.12 |
| Coated offset Media 4 | 1.07 | 0.07 | 1.55 | 0.06 | 1.7 | 0.08 | 1.85 | 0.09 |
| Coated offset Media 5 | 1.07 | 0.05 | 1.55 | 0.05 | 1.7 | 0.05 | 1.85 | 0.06 |
| Laser bond 6 | 1.02 | 0.34 | 1.51 | 0.36 | 1.75 | 0.35 | 1.91 | 0.34 |
| Laser bond 7 | 1.02 | 0.24 | 1.51 | 0.29 | 1.75 | 0.28 | 1.91 | 0.25 |
| Laser bond 8 | 1.02 | 0.16 | 1.51 | 0.14 | 1.75 | 0.13 | 1.91 | 0.16 |
| Laser bond 9 | 1.02 | 0.07 | 1.51 | 0.07 | 1.75 | 0.08 | 1.91 | 0.09 |
| Laser bond 10 | 1.02 | 0.04 | 1.51 | 0.05 | 1.75 | 0.06 | 1.91 | 0.07 |
| Laser bond 11 | 1.02 | 0.04 | 1.51 | 0.05 | 1.75 | 0.06 | 1.91 | 0.05 |

On both coated offset media and Hammermill laser bond paper, the durability of example Ink F significantly improved (i.e., less ink transferred) as the dry time increased. For both types of media, after 2 hours of drying, there was almost no transfer of Ink F from any of the bars. The amount of ink transferred after even longer dry times (e.g., 6 hours and 24 hours), did not change much from the results after 2 hours of dry time.

For Ink G, six different bars were formed on plain paper using ink drawn down. Each bar was allowed to dry for a different time (15 min, 30 min, 60 min, 2 hours, 5 hours, or 24 hours) before one pass of the highlighter was performed. The durability results for Ink F are shown in Table 9.

TABLE 9

Example Ink G-Durability Results

| Media | OD of Bar | Ink Trans. from Bar |
|---|---|---|
| Plain Paper 1 Dry Time = 15 min | 1.7 | 0.08 |
| Plain Paper 2 Dry Time = 30 min | 1.7 | 0.11 |
| Plain Paper 3 Dry Time = 60 min | 1.7 | 0.08 |
| Plain Paper 4 Dry Time = 2 hours | 1.7 | 0.09 |
| Plain Paper 5 Dry Time = 5 hours | 1.7 | 0.07 |
| Plain Paper 5 Dry Time = 24 hours | 1.7 | 0.06 |

Each example of Ink G exhibited little highlighter smear on plain paper. It was noted that the dry time did not seem to have an effect on the amount of Ink G that was transferred.

For example Ink H, there were a total of 5 bars printed and 5 adjacent white spaces on plain paper. Ink H was allowed to dry for 50 minutes, and then 2 passes of the highlighter were performed. The durability results for Ink H are shown in Table 10. The optical density of the bars shown in Table 10 is an average of two measurements.

TABLE 10

Example Ink H-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 | OD of Bar 5 | Ink Trans. from Bar 5 |
|---|---|---|---|---|---|---|---|---|---|---|
| Plain Paper | 1.24 | 0.11 | 1.38 | 0.14 | 1.48 | 0.15 | 1.51 | 0.16 | 1.57 | 0.17 |

Example Ink H exhibited little highlighter smear on plain paper.

The comparative example ink was printed on HP brochure media and on coated offset media. On the HP brochure paper, there were a total of 4 bars printed and 4 adjacent white spaces. On the coated offset media, there were a total of 5 bars printed and 5 adjacent white spaces.

Five examples (1-5) of the comparative example ink were printed on the HP brochure paper. Comparative Example Ink for the first example was allowed to dry for 30 minutes, and then 1 pass of the highlighter was performed. Comparative Example Ink for the second example was allowed to dry for 60 minutes, and then 1 pass of the highlighter was performed. Comparative Example Ink for the third example was allowed to dry for 3 hours, and then 1 pass of the highlighter was performed. Comparative Example Ink for the fourth example was allowed to dry for 24 hours, and then 1 pass of the highlighter was performed. Comparative Example Ink for the fifth example was allowed to dry for 24 hours, and then 2 passes of the highlighter were performed.

Nine examples (6-14) of the comparative example ink were printed on coated offset media. Comparative Example Ink for the sixth example was allowed to dry for 30 minutes, and then 1 pass of the highlighter was performed. Comparative Example Ink for the seventh example was allowed to dry for 10 minutes, and then 2 passes of the highlighter were performed. Comparative Example Ink for the eighth example was allowed to dry for 1 hour, and then 1 pass of the highlighter was performed. Comparative Example Ink for the ninth example was allowed to dry for 3 hours, and then 1 pass of the highlighter was performed. Comparative Example Ink for the tenth example was allowed to dry for 6 hours, and then 1 pass of the highlighter was performed. Comparative Example Ink for the eleventh example was allowed to dry for 24 hours, and then 1 pass of the highlighter was performed. Comparative Example Ink for the twelfth example was allowed to dry for 1 week, and then 1 pass of the highlighter was performed. Comparative Example Ink for the thirteenth example was allowed to dry for 2 weeks, and then 1 pass of the highlighter was performed. Comparative Example Ink for the fourteenth example was allowed to dry for 2 months, and then 1 pass of the highlighter was performed.

The durability results for the Comparative Example Ink are shown in Table 11.

TABLE 11

Comparative Example Ink-Durability Results

| Media | OD of Bar 1 | Ink Trans. from Bar 1 | OD of Bar 2 | Ink Trans. from Bar 2 | OD of Bar 3 | Ink Trans. from Bar 3 | OD of Bar 4 | Ink Trans. from Bar 4 | OD of Bar 5 | Ink Trans. from Bar 5 |
|---|---|---|---|---|---|---|---|---|---|---|
| HP Brochure Media 1 | 1.69 | 0.5 | 1.42 | 0.49 | 1.7 | 0.48 | 1.7 | 0.53 | NA | NA |
| HP Brochure Media 2 | 1.69 | 0.41 | 1.42 | 0.46 | 1.7 | 0.52 | 1.7 | 0.58 | NA | NA |
| HP Brochure Media 3 | 1.69 | 0.32 | 1.42 | 0.39 | 1.7 | 0.37 | 1.7 | 0.42 | NA | NA |
| HP Brochure Media 4 | 1.69 | 0.26 | 1.42 | 0.27 | 1.7 | 0.34 | 1.7 | 0.33 | NA | NA |
| HP Brochure Media 5 | 1.69 | 0.49 | 1.42 | 0.59 | 1.7 | 0.63 | 1.7 | 0.65 | NA | NA |
| Coated offset Media 6 | 0.26 | 0.12 | 0.51 | 0.21 | 1.03 | 0.38 | 1.48 | 0.62 | 1.65 | 0.71 |
| Coated offset Media 7 | 0.26 | 0.31 | 0.51 | 0.34 | 1.03 | 0.49 | 1.48 | 0.62 | 1.65 | 0.65 |
| Coated offset Media 8 | 0.26 | 0.1 | 0.51 | 0.17 | 1.03 | 0.31 | 1.48 | 0.47 | 1.65 | 0.65 |
| Coated offset Media 9 | 0.26 | 0.11 | 0.51 | 0.16 | 1.03 | 0.26 | 1.48 | 0.43 | 1.65 | 0.73 |
| Coated offset Media 10 | 0.26 | 0.09 | 0.51 | 0.17 | 1.03 | 0.29 | 1.48 | 0.53 | 1.65 | 0.58 |
| Coated offset Media 11 | 0.26 | 0.08 | 0.51 | 0.11 | 1.03 | 0.22 | 1.48 | 0.33 | 1.65 | 0.47 |
| Coated offset Media 12 | 0.26 | 0.07 | 0.51 | 0.09 | 1.03 | 0.16 | 1.48 | 0.24 | 1.65 | 0.45 |
| Coated offset Media 13 | 0.26 | 0.06 | 0.51 | 0.09 | 1.03 | 0.17 | 1.48 | 0.31 | 1.65 | 0.43 |
| Coated offset Media 14 | 0.26 | 0.04 | 0.51 | 0.05 | 1.03 | 0.06 | 1.48 | 0.08 | 1.65 | 0.18 |

The ink transfer of the comparative example ink from the bars printed on the HP brochure media was relatively high, even after 1 full day of drying.

The ink transfer of the comparative example ink from the bars printed on the coated offset media was improved when compared to the same ink printed on HP brochure media. However, the level of ink transfer from the $3^{rd}$ through $5^{th}$ bars was still relatively high, for example after 1 full day of drying (see results for transfer from bar 3, coated offset media 11), after 2 weeks of drying (see results for transfer from bar 4, coated offset media 13), and after 2 weeks of drying (see results for transfer from bar 5, coated offset media 13). For all of the examples of the comparative example ink printed on coated offset media, the durability was good after 2 months of drying. This long dry time may be undesirable for many printing applications.

Overall, the results of this Example show that various examples of the non-Newtonian inkjet ink disclosed herein exhibit improved durability on a wide variety of media types. In some examples, an increased dry time improves the durability. When compared to the commercially available comparative example ink, the durability of all of the example inks A-G exhibited significantly improved results.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of 10 nm or less should be interpreted to include not only the explicitly recited limits of about 10 nm or less, but also to include individual values, such as 2.5 nm, 8 nm, 0.25 nm, 5 nm, etc., and sub-ranges, such as from about 0.5 nm to about 2 nm, from about 1 nm to about 7 nm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A non-Newtonian inkjet ink, comprising:
   a first metal oxide nanoparticle selected from the group consisting of substantially spherical or non-spherical silica particles, alumina particles, zinc oxide particles, iron oxide particles, titanium oxide particles, and combinations thereof, the first metal oxide nanoparticle having a particle size of 10 nm or less, and the first metal oxide nanoparticle present in an amount ranging from about 5% to about 15% by weight based on a total weight of the non-Newtonian inkjet ink;
   a second metal oxide nanoparticle selected from the group consisting of alumina, titanium oxide, substantially spherical silica, anisotropic silica, and combinations thereof, the second metal oxide nanoparticle having at least one dimension greater than 10 nm, and the second metal oxide nanoparticle present in an amount ranging from 0.25% to 10% by weight based on the total weight of the non-Newtonian inkjet ink;
   a colorant in an amount ranging from about 0.5% to about 10% by weight based on the total weight of the non-Newtonian inkjet ink;
   an organic solvent in an amount ranging from about 5% to about 50% by weight based on the total weight of the non-Newtonian inkjet ink; and
   a balance of water.

2. The non-Newtonian inkjet ink as defined in claim 1 wherein the anisotropic silica i) is fibrous silica having a diameter ranging from about 5 nm to about 50 nm and a length ranging from about 50 nm to about 250 nm, or ii) is a chain silica formed of aggregated silica nanoparticles, wherein each silica nanoparticle in the chain has silica a diameter ranging from about 5 nm to about 50 nm and the chain has a length ranging from about 50 nm to about 250 nm.

3. The non-Newtonian inkjet ink as defined in claim 1, further comprising a sugar or a sugar alcohol in an amount ranging from about 2% to about 20% by weight based on the total weight of the non-Newtonian inkjet ink.

4. The non-Newtonian inkjet ink as defined in claim 3 wherein:
   the sugar is glucose; or
   the sugar alcohol is selected from the group consisting of sorbitol, mannitol, and combinations thereof.

5. The non-Newtonian inkjet ink as defined in claim 1 wherein the second metal oxide nanoparticle is alumina having an isoelectric point at or below a pH of the non-Newtonian inkjet ink.

6. The non-Newtonian inkjet ink as defined in claim 1, further comprising substantially spherical alumina having a particle size ranging from about 3 nm to about 10 nm.

7. The non-Newtonian inkjet ink as defined in claim 1 having a pH from 9 to 12 and a conductivity from about 100 µS/cm to about 2,000 µS/cm.

8. The non-Newtonian inkjet ink as defined in claim 1 wherein the first metal oxide nanoparticle and the second metal oxide nanoparticle form a structured network, and wherein the inkjet ink has a dynamic viscosity ranging from 5 cps to 10,000 cps at shear rate of 5 s$^{-1}$ and a dynamic viscosity ranging from 2 cps to 100 cps at a shear rate of at least 10,000 s$^{-1}$, measured at 25° C.

9. The non-Newtonian inkjet ink as defined in claim 8 wherein the structured network is free of a polymer.

10. The non-Newtonian inkjet ink as defined in claim 1, further comprising a dispersant.

11. An inkjet print cartridge loaded with the non-Newtonian inkjet ink as defined in claim 1, wherein the inkjet print cartridge is associated with a printhead to shear the non-Newtonian inkjet ink at a shear rate of 10,000 s$^{-1}$ or more to provide a dynamic viscosity ranging from 2 cps to 100 cps.

12. The non-Newtonian inkjet ink as defined in claim 1 wherein the colorant is selected from the group consisting of a pigment, a dye, and combinations thereof.

13. A non-Newtonian inkjet ink, comprising:
   a metal oxide combination consisting of:
      small metal oxide nanoparticle selected from the group consisting of substantially spherical or non-spherical silica particles, alumina particles, zinc oxide particles, iron oxide particles, titanium oxide particles, and combinations thereof, the small metal oxide nanoparticle having a particle size of 10 nm or less, and the small metal oxide nanoparticle present in an amount ranging from about 5% to about 15% by weight based on a total weight of the non-Newtonian inkjet ink; and
      larger metal oxide nanoparticle selected from the group consisting of alumina, titanium oxide, substantially spherical silica, anisotropic silica, and combinations thereof, the larger metal oxide nanoparticle having at least one dimension greater than 10 nm, and the larger metal oxide nanoparticle present in an amount ranging from 0.25% to 10% by weight based on the total weight of the non-Newtonian inkjet ink;
   a colorant in an amount ranging from about 0.5% to about 10% by weight based on the total weight of the non-Newtonian inkjet ink;

an organic solvent in an amount ranging from about 5% to about 50% by weight based on the total weight of the non-Newtonian inkjet ink; and
a balance of water.

* * * * *

UNITED STATES PATENT AND TRADEMARK OFFICE
CERTIFICATE OF CORRECTION

PATENT NO. : 10,364,367 B2
APPLICATION NO. : 15/561835
DATED : July 30, 2019
INVENTOR(S) : Raymond Adamic et al.

Page 1 of 1

It is certified that error appears in the above-identified patent and that said Letters Patent is hereby corrected as shown below:

On the Title Page

In Column 1, item (73), Assignee, Line 1, delete "Hewett-Packard" and insert -- Hewlett-Packard --, therefor.

Signed and Sealed this
Tenth Day of December, 2019

Andrei Iancu
*Director of the United States Patent and Trademark Office*